United States Patent
Stern et al.

(10) Patent No.: US 10,156,679 B2
(45) Date of Patent: Dec. 18, 2018

(54) PHOTONIC CHIPS BASED ON MULTIMODE FIBER-TO-WAVEGUIDE COUPLING

(71) Applicant: Cornell University, Ithaca, NY (US)

(72) Inventors: Brian Stern, Ithaca, NY (US); Michal Lipson, Ithaca, NY (US); Aseema Mohanty, Austin, TX (US); Felippe Barbosa, Ithaca, NY (US); Jaime Cardenas, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 15/688,427

(22) Filed: Aug. 28, 2017

(65) Prior Publication Data

US 2018/0156979 A1   Jun. 7, 2018

Related U.S. Application Data

(63) Continuation of application No. 15/150,350, filed on May 9, 2016, now Pat. No. 9,746,614.

(60) Provisional application No. 62/159,117, filed on May 8, 2015.

(51) Int. Cl.
| | |
|---|---|
| *G02B 6/30* | (2006.01) |
| *G02B 6/14* | (2006.01) |
| *G02B 6/028* | (2006.01) |
| *G02B 6/122* | (2006.01) |
| *G02B 6/42* | (2006.01) |
| *H04J 14/04* | (2006.01) |

(52) U.S. Cl.
CPC ........... *G02B 6/305* (2013.01); *G02B 6/0288* (2013.01); *G02B 6/1228* (2013.01); *G02B 6/14* (2013.01); *G02B 6/4291* (2013.01); *H04J 14/04* (2013.01)

(58) Field of Classification Search
None
See application file for complete search history.

(56) References Cited

U.S. PATENT DOCUMENTS

| 5,533,155 A | 7/1996 | Barberio et al. |
|---|---|---|
| 6,625,349 B2 | 9/2003 | Zhao et al. |
| 6,987,913 B2 * | 1/2006 | Blauvelt ............ G02B 6/12002 385/28 |
| 2004/0071403 A1 | 4/2004 | Lipson et al. |
| 2011/0116741 A1 | 5/2011 | Cevini et al. |
| 2016/0077282 A1 | 3/2016 | Lipson et al. |

FOREIGN PATENT DOCUMENTS

WO   2014176175 A1   10/2014

OTHER PUBLICATIONS

Tiecke, T. G. et al., "Efficient fiber-optical interface for nanophotonic devices", Optica 2, No. 2, vol. 70, Feb. 20, 2017, 8 pages.

* cited by examiner

*Primary Examiner* — Jerry Rahll
(74) *Attorney, Agent, or Firm* — Perkins Coie LLP

(57) ABSTRACT

Optical coupling designs are disclosed to provide a photonic device, for example, that includes a substrate; an optical waveguide formed on the substrate and configured as a multimode waveguide to support light in different optical waveguide modes; and an optical fiber structured as a multimode fiber to support light in different optical fiber modes, the optical fiber located above the optical waveguide and optically coupled to the optical waveguide via evanescent coupling to allow light to be coupled between the optical fiber and the optical waveguide.

17 Claims, 5 Drawing Sheets

PHOTONIC CHIPS BASED ON MULTIMODE FIBER-TO-WAVEGUIDE COUPLING

PRIORITY AND RELATED APPLICATION

This patent document is a continuation application of U.S. patent application Ser. No. 15/150,350 entitled "PHOTONIC CHIPS BASED ON MULTIMODE FIBER-TO-WAVEGUIDE COUPLING" and filed May 9, 2016, now U.S. Pat. No. 9,756,614, which claims the priority of U.S. Provisional Application No. 62/159,117 entitled "PHOTONIC CHIPS BASED ON MULTIMODE FIBER-TO-WAVEGUIDE COUPLING" and filed May 8, 2015, which are incorporated by reference as part of this patent document.

TECHNICAL FIELD

This patent document relates to optical coupling between a fiber and a waveguide and its applications in photonic chips and other devices or applications.

BACKGROUND

In various applications, there is a need to couple light between a fiber and an optical waveguide. Due to the differences in structure between fiber and optical waveguides and due to optical alignment between the fiber and optical waveguide, such coupling tends to exhibit some optical loss and may vary depending on the alignment between the fiber and waveguide.

SUMMARY

The disclosed technology can be implemented to couple the optical modes from a multimode fiber to the modes of an integrated waveguide. In one embodiment, each fiber mode corresponds to a defined waveguide mode. This allows for selective handling of the spatial modes of the fiber in the fiber-waveguide coupling. Routing or filtering, for example, may be done on certain modes individually. In some embodiments, the integrated multimode coupler formed by the multimode fiber and the waveguide is coupled to a mode demultiplexer and feeds coupled light into the mode demultiplexer. After this demultiplexer, the light processing may be done using integrated single mode waveguides.

In one aspect, a photonic device is provided to include a substrate; an optical waveguide formed on the substrate and configured as a multimode waveguide to support light in different optical waveguide modes; and an optical fiber structured as a multimode fiber to support light in different optical fiber modes, the optical fiber located above the optical waveguide and optically coupled to the optical waveguide via evanescent coupling to allow light to be coupled between the optical fiber and the optical waveguide.

In another aspect, a photonic device is provided to include a substrate; and an input/output multimode optical waveguide formed on the substrate and configured to support light in different optical waveguide modes as an input/output optical port of the substrate. The input/output multimode optical waveguide includes a tapered waveguide terminal that decreases in cross section towards a tip of the tapered waveguide terminal. This device further includes an optical multimode multiplexing/demultiplexing coupler coupled to the input/output multimode optical waveguide to either receive different optical signals in different optical single modes to combine the received different optical signals into a multimode signal to the input/output multimode optical wave, or to receive a multimode optical signal from the input/output multimode optical wave to split the received multimode optical signal into different optical signals in different optical single modes; and a plurality of single mode optical waveguides formed on the substrate and optically coupled to the input/output multimode optical waveguide to guide, respectively, the different optical signals in different optical modes, either from the input/output multimode optical waveguide or to the input/output multimode optical waveguide. In addition, optical processing modules are formed on the substrate and coupled to the single mode optical waveguides, respectively, and each optical processing module is configured to process a respective optical signal of a single optical mode. A multimode optical fiber is structured to support light in different optical fiber modes and is located above the input/output multimode optical waveguide to be optically coupled to the input/output multimode optical waveguide via evanescent coupling to allow light to be coupled between the optical fiber and the input/output multimode optical waveguide. In this device, the multimode optical fiber includes a tapered fiber terminal which decreases in cross section towards a tip of the tapered fiber terminal and thus tapers in an opposite direction from tapering of the tapered waveguide terminal, and the tapered fiber terminal and the tapered waveguide terminal spatially overlap with each other to cause adiabatic transition of guided light and to cause coupling of different modes between the tapered fiber terminal and the tapered waveguide terminal.

In yet another aspect, a method is provided for using a multimode optical coupler in coupling light and includes spatially overlapping a first multimode optical waveguide having a first spatially tapered waveguide terminal to adiabatically transition light in different first optical modes with a second multimode optical waveguide having a second spatially tapered waveguide terminal to adiabatically transition light in different first optical modes in an opposite tapering direction of a tapering direction of the first spatially tapered waveguide terminal, causing optical coupling between the first optical modes and the second optical modes; and using the first multimode optical waveguide to guide multimode light in the first optical modes into the second multimode optical waveguide in the second optical modes.

Those and other features of the disclosed technology area described in greater detail in the drawings, the description and the claims.

BRIEF DESCRIPTION OF DRAWINGS

FIG. 1A shows the fiber taper (or a polymer waveguide taper) and the on-chip waveguide taper. FIG. 1B and FIG. 1C show two different cross-section views of the coupler in FIG. 1A.

DETAILED DESCRIPTION

Figure 1A:
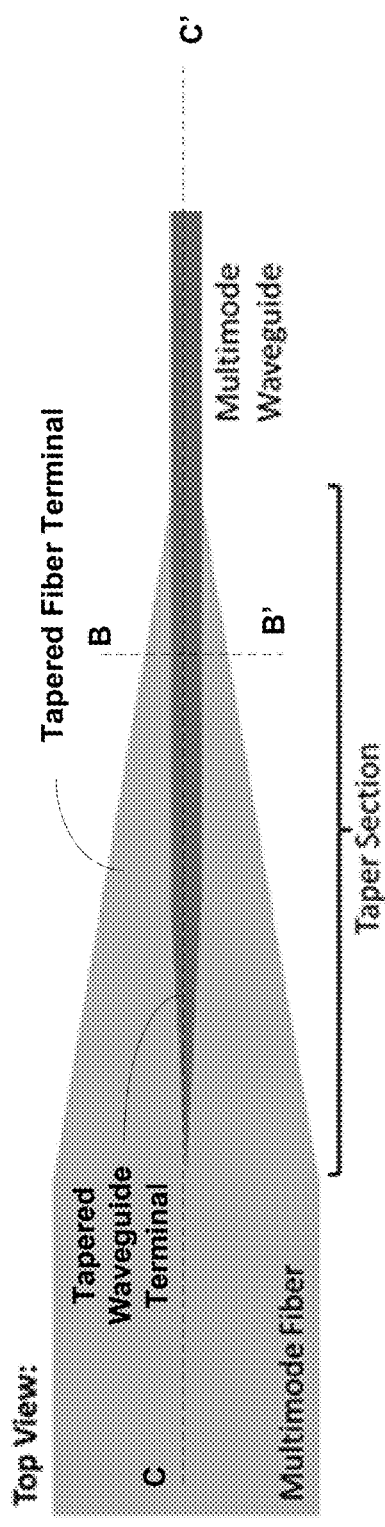
FIGS. 1A, 1B and 1C show an example of a Fiber-to-Chip Multimode Coupler that implements the disclosed technology.

An optical waveguide formed on a substrate can be used to receive light from a source off the substrate and to provide the received light to a photonic circuit formed on the substrate or to export the light from the photonic chip out of the chip. A fiber can be optically coupled to the waveguide to deliver the light into the waveguide or to receive the light from the waveguide. When the fiber is a multimode fiber and the waveguide is a multimode waveguide, there can be a significant or large mode-mismatch between the multimode fiber and the on-chip waveguide. A mode can be an optical mode supported by a fiber or waveguide, including different polarization spatial modes. A mode mismatch can lead to poor coupling efficiency between the fiber and the waveguide and loss of much of the information and power held in the fiber's modes. Efficient optical coupling from the multiple spatial modes of a multimode fiber to waveguides on-chip for individual signal processing is more difficult single mode coupling between a single-mode waveguide and a single-mode fiber. Tiecke et al. demonstrated using a tapered single mode fiber and single mode waveguide for efficient fiber-to-chip coupling through adiabatic evanescent coupling (about 97%) in an article entitled "Efficient fiber-optical interface for nanophotonic devices" in Optica 2015; 2: 70-75 (2015).

The technology disclosed in this patent document can be used to provide a conversion for multimode fiber to on-chip waveguides, which, even at a relatively low efficiency, would be very useful for telecommunications and signal processing. Spatial mode multiplexing is a promising new technology for high data rate transmission. The coupling between the multimode fiber and the on-chip waveguide based on the disclosed technology in this patent document uses a side by side placement of the multimode fiber and the multimode waveguide via evanescent coupling between them. Some aspects of such side by side placement of a waveguide on a chip and a fiber off the chip are disclosed in the Cornell University's U.S. Patent Publication No. US20160077282A1 entitled "Fiber-waveguide evanescent coupler" by inventors Michal Lipson and Biswajeet Guha, which was included as part of the U.S. Provisional Application No. 62/159,117 and is incorporated by reference as part of this patent document.

Implementations of the disclosed technology can use an adiabatic coupler to convert the modes of a multimode fiber as one system to the modes of a waveguide on an integrated photonic chip as another system. The transition between two multimode systems can be configured to be optically adiabatic to achieve nearly lossless or efficient one-to-one mode coupling between the two systems. This adiabatic condition can be achieved by structuring the optical waveguide to include a tapered waveguide terminal, structuring the optical fiber to include a tapered fiber terminal, and placing the tapered fiber terminal of the fiber over the tapered waveguide terminal on the substrate to spatially overlap with the tapered waveguide terminal of the optical waveguide. This structure provides a multimode fiber-to-chip mode coupler.

Figure 1B:
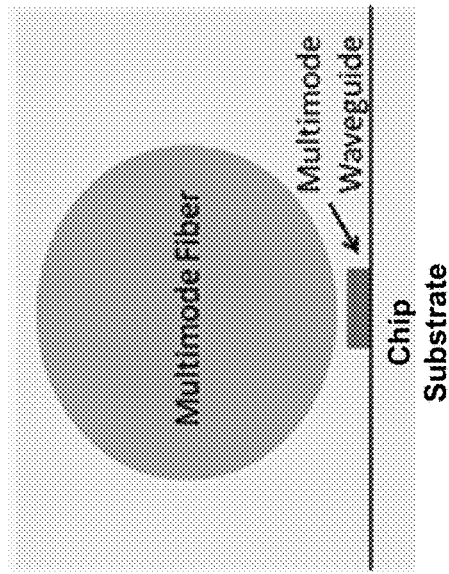
Figure 1C:
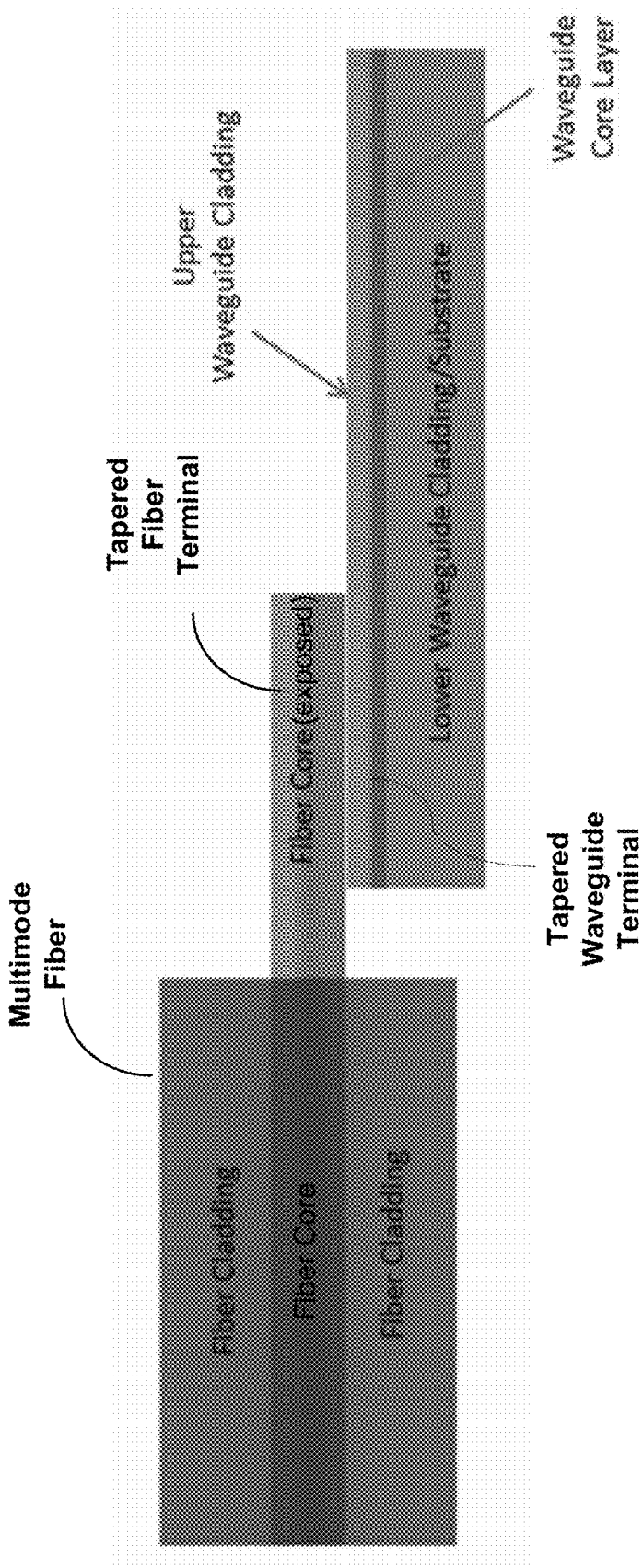

FIGS. 1A, 1B and 1C illustrate an example of such a multimode fiber-to-chip mode coupler. As illustrated, the multimode fiber has a fiber terminal that is positioned over the chip substrate to align with the waveguide terminal of a multimode optical waveguide formed on the substrate of the photonics chip as illustrated by the top view in FIG. 1A. The waveguide terminal is an input/output (I/O) port of the chip to receive light from the fiber or to export light from the chip to the fiber. FIG. 1B shows a first side view of a cross section of the coupler along line B-B' that is perpendicular to the fiber and the waveguide where the fiber terminal is shown to be vertically displaced above the waveguide terminal on the substrate. In this illustrated example, the fiber core of the multimode fiber is larger in cross section than that of the waveguide terminal. FIG. 1C shows a second view of a cross section of the coupler along line C-C' that is parallel to and is along the center of the fiber and the waveguide where the fiber cladding in the tapered fiber terminal is removed.

In operation, the fiber-to-chip mode coupler having the spatially overlap between the tapered multimode fiber and the tapered on-chip waveguide to cause an evanescent coupling vertically. Both the multimode fiber and multimode waveguide may be tapered to delocalize their respective optical modes. The tapering in the fiber terminal causes the optical modes of the fiber to slowly transition to the modes of the waveguide. In the illustrated example in FIG. 1A, the fiber is tapered uniformly (or radially) by pulling the fiber with controlled automated stages as heat is applied, shrinking its diameter, but not too thin so as to no longer support all of the higher-order modes. The fiber diameter may be, for example, greater than 200 nm and less than 200 or 300 micrometers (e.g., less than 20 micrometers in some implementations). The integrated waveguide is fabricated using standard lithography and etching techniques.

In some implementations, the waveguide material may be a CMOS compatible material such as silicon or silicon nitride, and may be structured to have an index of refraction greater than 1.3 and less than 5. The waveguide may be clad with another material of a lower index as indicated by the "upper waveguide cladding" in FIG. 1C and may also be clad air without the upper cladding. The separation between the integrated waveguide and the fiber may range from direct contact to some spacing, e.g., several micrometers in some applications, based on the desired evanescent coupling needed between the fiber terminal and the waveguide terminal. For stronger interaction of the evanescent field to the fiber, the waveguide can be left unclad.

Figure 2:
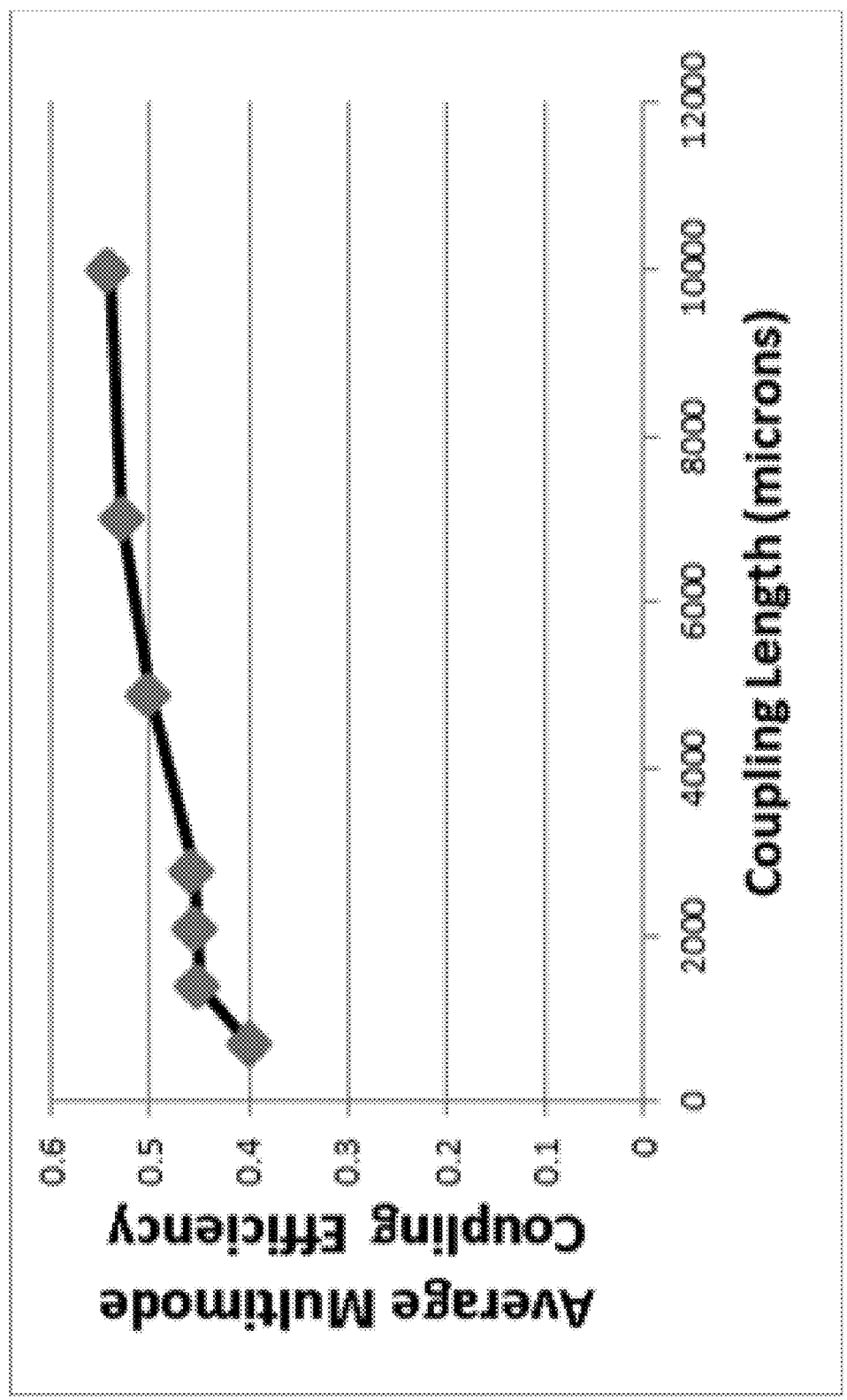
FIG. 2 shows an example of results of power coupling simulation from the coupler shown in FIGS. 1A, 1B and 1C formed by a six-mode multimode fiber and a SiN multimode waveguide. This shows an average of 50% coupling from all the fiber modes.

The tapering length of the fiber and tapering length of the waveguide can be selected and optimized for the desired coupling and may be determined by, for example, simulating power transfer between the fiber and the waveguide. Simulations in FIG. 2 show that at least 50% of the power in a 6-mode fiber can be coupled to a multimode waveguide. The simulation is for a specific geometry of waveguide and fiber which can be optimized for better coupling.

In implementing the disclosed technology, the tapered fiber can be brought close to the waveguide taper to vertically couple the input light from the fiber. This vertical distance as shown in FIGS. 1B and 1C can be optimized given the geometry of the fiber and the waveguide and materials used in the fiber and the waveguide. Conducted simulations suggest efficient coupling can be achieved by direct contact between the tapered fiber terminal and the tapered waveguide (zero or near zero vertical spacing) or by some small spacing up a certain vertical distance limit based on the needed coupling efficiency (e.g., 1 micrometer but usually less than 500 nm in some examples). In practical device implementations, this vertical spacing can be achieved using various mechanisms, including, e.g., micropositioning stages or other actuated support for providing an adjustable control over the vertical spacing, or packaging of the fiber to the chip which can also be used to hold the fiber in place permanently. The coupling may also be aided by using a fluid between and surrounding the waveguide and fiber to engineer the index contrast and thus mode size and shape.

Figure 3:
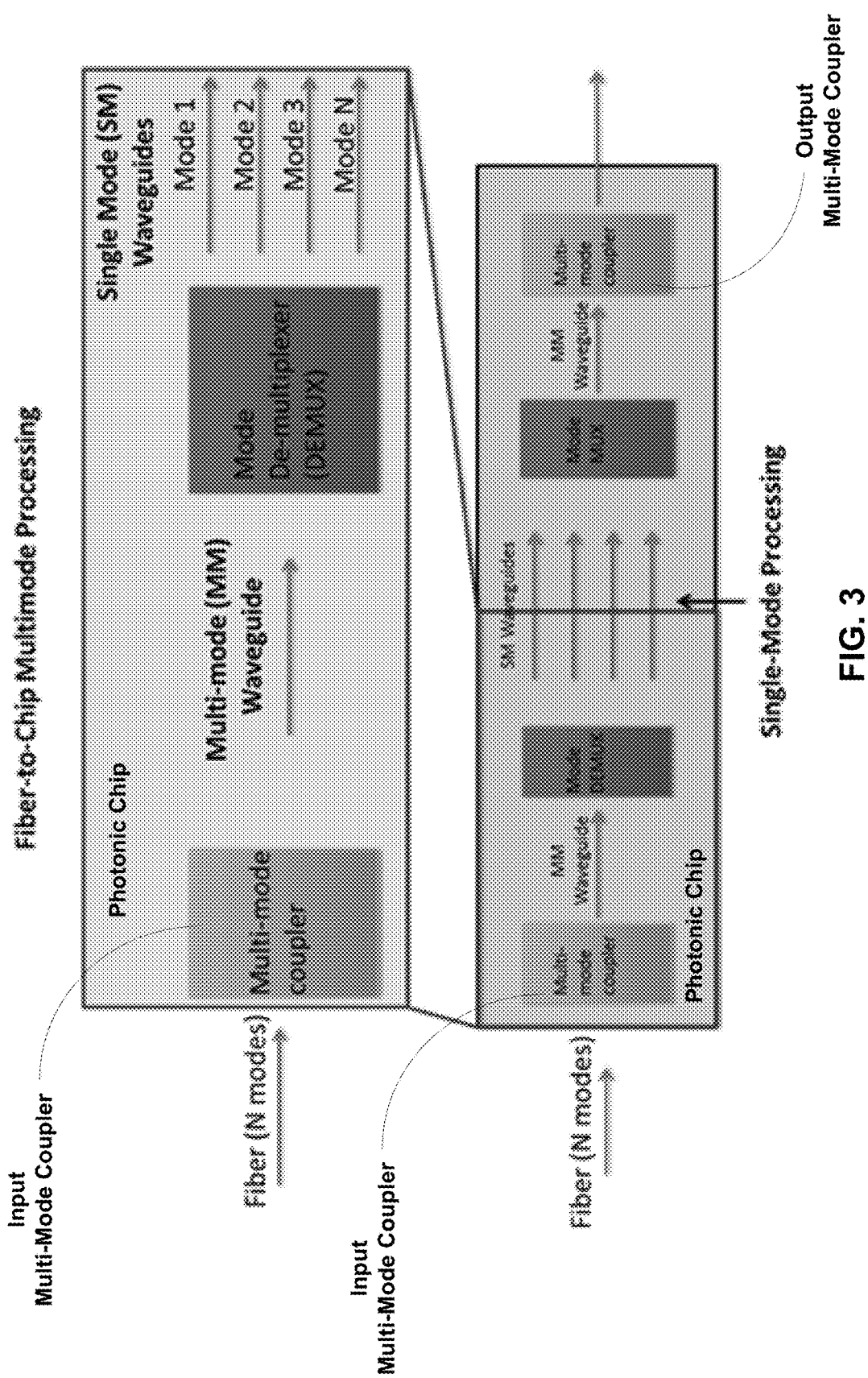
FIG. 3 shows an example of Fiber-to-Chip Multimode Signal Processing. The upper image shows the first stage of an on-chip multimode processor. The fiber-to-chip multimode coupler will convert the fiber modes to the modes within a waveguide. The mode-demultiplexer will convert the modes of the waveguide to single mode waveguides for processing.

FIG. 3 shows an example of on-chip multimode processing based on the fiber-waveguide coupler in FIGS. 1A-1C as an input or output port of a photonics chip. The multimode waveguide is coupled by a demultiplexer to different single mode waveguides and the multimode light is demultiplexed to different optical signals in single modes that are fed into different single mode waveguides, respectively. This can be accomplished by using various demultiplexing techniques, e.g., using asymmetric directional couplers or ring resonators. The single mode waveguides can be used for signal processing including filtering and modulation. After the single-mode processing in the single-mode waveguides, the signals may be coupled back into a multimode waveguide by using a mode multiplexer on the chip and the light in the multimode waveguide can be coupled to a multimode fiber using a fiber-to-chip multimode coupler shown in FIGS. 1A-1C that is operated in a reverse process.

In implementations, various features may be used. For example, the fiber may be narrowed to a thinner diameter but not noticeably changing throughout the coupling region; or it may be tapering during the coupling. The fiber may be any type of waveguide with an index of refraction greater than that of its cladding, but less than that of the bottom waveguide as it tapers wider. The fiber may be a waveguide drawn into a long cylinder made of silica, for example. It alternately may be a polymer or dielectric of possibly rectangular shape which may be defined lithographically over the waveguide. If the fiber waveguide is a deposited material such as a polymer, it may enclose the bottom integrated waveguide or be vertically or horizontally separated or in contact. The waveguide may be single-mode or multimode at different parts of the taper. The waveguide may be tapering or of constant width at different parts during coupling. The beginning of the waveguide may be a small point or width near the lithography limit, typically from 10-100 nm.

In some applications, the disclosed technology can be used to efficiently collect power from all the modes of a fiber. This is useful for collecting the entire signal from a multimode fiber for use on-chip. Also, if the identity of the modes is captured by the correspondence of fiber modes with waveguide modes, it is useful for on-chip signal processing. This could be used to increase data transmission rates in optical communication by increasing the number of spatial mode channels of fiber. The device could also be used in reverse to generate modes of a fiber from on chip, or to return to a multimode fiber after arriving on the chip after beginning with a different multimode fiber. In reverse, the multimode waveguide may taper narrower as the modes adiabatically transfer into the fiber.

Figure 4:
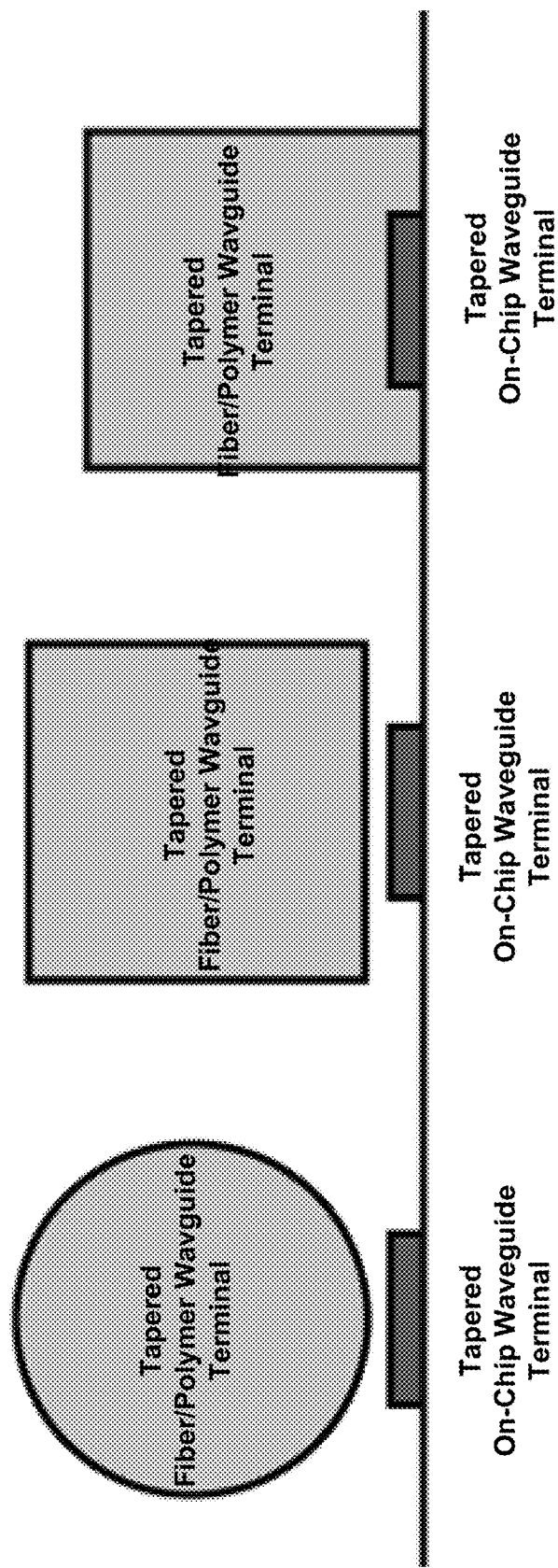
FIG. 4 shows different coupler arrangements and geometries.

In various applications, various features may be used. For example, the fiber suitable for the disclosed coupler may be another multimode waveguide such as a multimode polymer waveguide or another waveguide having an effective index of refraction of the mode larger than that of the integrated waveguide. Examples of the fiber include a silica fiber, a polymer waveguide, a dielectric waveguide formed of a material such as silicon oxynitride. When using a polymer waveguide off the chip for coupling with the on-chip waveguide, the polymer waveguide may be shaped as a square or rectangular polymer material such as epoxy, acrylate, siloxane, or SU-8). FIG. 4 shows three examples of coupler arrangements and geometries. The polymer index of refraction, index contrast, and size can be designed to be nearly identical to that of a traditional fiber in some implementations. The polymer index may be similar, less than, or greater than that of glass fiber, probably in the range 1.3 to 2 (or 1.3 to 5 to be more inclusive). The polymer is not necessarily a CMOS compatible material. The light can be coupled from a multimode polymer waveguide to the integrated e.g. silicon or silicon nitride waveguide ("the waveguide") in a nearly identical way. The polymer waveguide could be integrated above the on-chip waveguide, placed on the side of the on-chip waveguide or even enclose the on-chip waveguide. A multimode fiber can butt couple to the polymer waveguide with very little loss if the size and index contrast are similar or the modes match. The fiber could be placed in a groove or otherwise aligned to the polymer waveguide. All of the modes go from the multimode fiber to the multimode polymer. Then the polymer waveguide's modes evanescently couple into the waveguide as the waveguide adiabatically tapers wider. The waveguide can be tapered with a sufficient taper width to support the number of modes desired to be taken from the multimode fiber or polymer.

The disclosed multimode coupler with the tapers can be used for coupling higher order modes from 2 or more modes to 3 or 4 or more modes in various applications.

The disclosed multimode coupler can be implemented for various applications, including coupling light from multimode sources, such as VCSELs, which are typically coupled to multimode fibers, to a photonic integrated chip; coupling with regard to mode content so that the original distribution of power in the various modes of the fiber can be determined on the chip; coupling without regard to mode content such that it is simply desired to get the largest amount of power from the fiber onto the chip; coupling with intent to send back to multimode fiber (by using the adiabatic coupler in reverse, from multimode waveguide adiabatically tapering narrower to couple to the fiber output, wherein while on chip some processing may or may not be done, and this processing may possibly be done after demultiplexing to single mode waveguides.

In implementations, the effective index of the mode in the tapering waveguide can be set to be equal to or greater than the mode in the fiber when they begin to couple. When the fiber and waveguide are close, and the waveguide has tapered sufficiently wide, a supermode exists and begins to transition from being mostly confined in the fiber to being mostly confined in the waveguide as the waveguide adiabatically tapers wider. The fiber modes must have greater effective indexes than the index of the waveguide cladding, if it is present, or else the waveguide must taper wide enough to have an index at or above that of the fiber modes within a short distance from the beginning of the structure or else the mode will leak into the cladding/substrate and be lost.

In some implementations, the shape of the waveguide tapering structure may a linear taper as shown in FIG. 1A and may be in other non-linear tapering profiles, including, e.g., a parabolic taper profile. The tapering may also be segmented into multiple segments of discrete or continuously varying taper angle, in order to optimize the size of the overall structure or to design the mode mapping from the fiber to the waveguide.

The disclosed technology can be used for light coupling of various wavelengths, including, e.g., The wavelengths from 400 nm to 1.7 um and other wavelengths.

Different from what is shown in the example in FIG. 1A, the waveguide, once it adiabatically tapers, may be a width greater than or less than that of the fiber. The tapered waveguide terminal can be used to support at least the number of modes as contained in the fiber, or at least as many as are desired to be coupled. The initial width of the taper may either be a point or a fixed small width, such as the lithography limit (e.g. 100 nm). The sudden introduction of the endpoint may incur a small loss and reflection. Rather than tapering the width of the waveguide, the device still works if the waveguide is multimode in the vertical direction and vertically tapering wider, but this geometry is less common to fabricate.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the Figures in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Only a few implementations and examples are described and other implementations, enhancements and variations can be made based on what is described and illustrated in this patent document and its Attachment.

What is claimed is:

1. A photonic device, comprising:
a substrate;
an optical waveguide formed on the substrate and configured as a multimode waveguide to support light in different optical waveguide modes; and
an optical fiber structured as a multimode fiber to support light in different optical fiber modes, the optical fiber vertically displaced above the optical waveguide by a vertical distance adjustable by an actuated support and optically coupled to the optical waveguide via evanescent coupling to allow light to be coupled between the optical fiber and the optical waveguide, wherein:
the optical waveguide includes a tapered waveguide terminal;
the optical fiber includes a tapered fiber terminal which spatially overlaps with the tapered waveguide terminal of the optical waveguide; and
the tapered fiber terminal which spatially overlaps with the tapered waveguide terminal of the optical waveguide has a cross section that decreases towards a direction along which the tapered waveguide terminal of the optical waveguide has a cross section that increases.

2. The device as in claim 1, wherein the vertical distance ranges from zero to one micrometer.

3. The device as in claim 1, further comprising:
one or more photonic components or devices formed on the substrate to receive light from or to send light to the optical fiber via the optical waveguide.

4. The device as in claim 1, wherein:
the optical waveguide includes a tapered waveguide terminal that decreases in cross section towards a tip of the tapered waveguide terminal;
the optical fiber includes a tapered fiber terminal which decreases in cross section towards a tip of the tapered fiber terminal and thus tapers in an opposite direction from tapering of the tapered waveguide terminal; and
the tapered fiber terminal and the tapered waveguide terminal spatially overlap with each other to cause adiabatic transition of guided light and to cause coupling of different modes between the tapered fiber terminal and the tapered waveguide terminal.

5. The device as in claim 1, further comprising a fluid disposed between the optical waveguide and the optical fiber.

6. A photonic device, comprising:
a substrate;
an input/output multimode optical waveguide formed on the substrate and configured to support light in different optical waveguide modes as an input/output optical port of the substrate;
an optical multimode multiplexing/demultiplexing coupler coupled to the input/output multimode optical waveguide to either receive different optical signals in different optical single modes to combine the received different optical signals into a multimode signal to the input/output multimode optical wave, or to receive a multimode optical signal from the input/output multimode optical wave to split the received multimode optical signal into different optical signals in different optical single modes;
a plurality of single mode optical waveguides formed on the substrate and optically coupled to the input/output multimode optical waveguide to guide, respectively, the different optical signals in different optical modes, from the input/output multimode optical waveguide or to the input/output multimode optical waveguide;
optical processing modules formed on the substrate and coupled to the single mode optical waveguides, respectively, wherein each optical processing module is configured to process a respective optical signal of a single optical mode; and
a multimode optical fiber structured to support light in different optical fiber modes, the multimode optical fiber located above the input/output multimode optical waveguide and optically coupled to the input/output multimode optical waveguide via evanescent coupling to allow light to be coupled between the optical fiber and the input/output multimode optical waveguide,
wherein a portion of the multimode optical fiber and a portion of the multimode optical waveguide spatially overlap with each other to cause adiabatic transition of guided light and to cause coupling of different modes between the multimode optical fiber and the multimode optical waveguide, and
wherein the overlapped portion of the optical fiber vertically displaced above the overlapped portion of the optical waveguide by a vertical distance.

7. The device as in claim 6, wherein the vertical distance ranges from zero to one micrometer.

8. The device as in claim 6, wherein the vertical distance is adjustable by an actuated support.

9. The device as in claim 6, further comprising a fluid disposed between the overlapped portion of the optical waveguide and the overlapped portion of the optical fiber.

10. The device as in claim 6, wherein each optical processing module is configured to perform optical filtering in a single optical mode.

11. The device as in claim 10, wherein each optical processing module is configured to perform optical routing from one single mode waveguide to another single mode waveguide in a single optical mode.

12. The device as in claim 10, wherein the optical fiber has a diameter greater than 200 nm and less than 20 micrometers.

13. The device as in claim 10, wherein the optical fiber has a diameter greater than 200 nm and less than 3000 micrometers.

14. A method for using a multimode optical coupler in coupling light, comprising:

spatially overlapping a first multimode optical waveguide having a first waveguide terminal to adiabatically transition light in different first optical modes with a second multimode optical waveguide having a second waveguide terminal to adiabatically transition light in different first optical modes causing optical coupling between the first optical modes and the second optical modes;

using the first multimode optical waveguide to guide multimode light in the first optical modes into the second multimode optical waveguide in the second optical modes;

splitting the light in the second optical modes from the second multimode optical waveguide into individual optical signals in single optical modes;

processing the individual optical signals in single optical modes, separately;

combining the processed optical signal optical modes into a multimode signal; and directing the multimode signal into a third multimode optical waveguide having a third waveguide terminal to adiabatically transition light in different third optical modes with a fourth multimode optical waveguide having a fourth waveguide terminal to adiabatically transition light in different fourth optical modes causing optical coupling between the third optical modes and the fourth optical modes to couple the multimode signal into the fourth multimode optical waveguide.

15. The method as in claim 14, wherein the first multimode optical waveguide includes a multimode optical fiber.

16. The method as in claim 14, wherein the first multimode optical waveguide includes a multimode polymer waveguide.

17. The method as in claim 16, wherein the second and the third multimode optical waveguides are integrated waveguides formed on a substrate in a photonic chip.

* * * * *